United States Patent
Mejia Mejia et al.

(10) Patent No.: US 12,176,587 B2
(45) Date of Patent: Dec. 24, 2024

(54) CELL VOLTAGE CONTROL THROUGH OXYGEN STARVATION FOR FUEL CELL SYSTEMS

(71) Applicant: FORD GLOBAL TECHNOLOGIES, LLC, Dearborn, MI (US)

(72) Inventors: Valentina Mejia Mejia, Royal Oak, MI (US); Zeng Qiu, Grosse Pointe Woods, MI (US); William Frederick Sanderson, Jr., Commerce Township, MI (US); Milos Milacic, Canton, MI (US); Majed Ben-Kalefa, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 17/669,867

(22) Filed: Feb. 11, 2022

(65) Prior Publication Data
US 2023/0261223 A1 Aug. 17, 2023

(51) Int. Cl.
*H01M 8/04537* (2016.01)
*B60L 58/31* (2019.01)
*H01M 8/04225* (2016.01)
*H01M 8/04746* (2016.01)

(52) U.S. Cl.
CPC ......... *H01M 8/04559* (2013.01); *B60L 58/31* (2019.02); *H01M 8/04225* (2016.02); *H01M 8/04753* (2013.01); *H01M 8/04776* (2013.01); *H01M 2250/20* (2013.01)

(58) Field of Classification Search
CPC ........ H01M 8/04559; H01M 8/04225; H01M 8/04753; H01M 8/04776; H01M 2250/20; B60L 58/31

USPC ........................................................ 429/429
See application file for complete search history.

(56) References Cited

U.S. PATENT DOCUMENTS

| | | | |
|---|---|---|---|
| 2004/0001980 A1* | 1/2004 | Balliet | H01M 8/04231 429/429 |
| 2005/0227126 A1* | 10/2005 | Korytnikov | H01M 8/04268 429/513 |
| 2008/0254341 A1* | 10/2008 | Bailey | H01M 12/065 429/407 |
| 2009/0148730 A1* | 6/2009 | Chizawa | H01M 8/04089 429/499 |
| 2013/0323616 A1 | 12/2013 | Fellows | |
| 2016/0133965 A1* | 5/2016 | Imanishi | H01M 8/04231 429/444 |

FOREIGN PATENT DOCUMENTS

| | | |
|---|---|---|
| CN | 100446319 C | 12/2008 |
| DE | 102009036197 B4 | 3/2013 |
| JP | 6164200 B2 | 6/2017 |

\* cited by examiner

*Primary Examiner* — Christian Roldan
(74) *Attorney, Agent, or Firm* — David B Kelley; Brooks Kushman P.C.

(57) ABSTRACT

Systems and methods of managing the voltage of fuel cells during no-load or low load events are disclosed. The systems may employ one or more valves such as an inlet and outlet valve for metering the fuel (e.g., hydrogen) and/or oxidant (e.g., oxygen) provided to the fuel cell. The voltage or voltage rise may be limited by starving the fuel cell of, for example, oxygen. A controller may be employed for controlling the one or more valves during a no-load or low load event such as start-up, idling, or stopping.

14 Claims, 5 Drawing Sheets

CELL VOLTAGE CONTROL THROUGH OXYGEN STARVATION FOR FUEL CELL SYSTEMS

TECHNICAL FIELD

The instant disclosure relates to fuel cells and more specifically, managing fuel cell voltage during no-load or low load events.

BACKGROUND

Fuel cells are a source of energy that may be used to power electric machines such as those in vehicles. Fuel cells often rely on reactions between readily available material such as hydrogen and oxygen. However, fuel cells employ rare and valuable catalysts to induce the necessary reactions and house sensitive electrolyte materials. Managing the cell voltage may improve the longevity of a fuel cell.

SUMMARY

A power system such as a vehicle power system is disclosed. The power system may include a fuel cell, a compressor, and a bypass valve. The fuel cell includes an anode and a cathode with an electrolyte therebetween. The fuel cell also has a fuel passage configured to provide fuel to the anode and an oxidant passage having an inlet and outlet. The oxidant passage may be configured to provide oxidant to the cathode. The oxidant passage may have an inlet valve in the inlet and/or an outlet valve in the outlet. The fuel cell may be configured to produce an electrical current during operation when sufficient fuel and oxidant are provided. The compressor is in fluid communication with the inlet of the oxidant passage and is configured to provide oxidant to the fuel cell. The inlet valve is configured to manage the oxidant such that during a no-load or low load event a reduced amount of oxidant (i.e., an amount below a threshold operating amount) is provided to the cathode. The bypass valve is disposed between the compressor and inlet valve. The bypass valve is configured to release the oxidant such that the compressor and/or oxidant passage does not exceed a threshold pressure.

A vehicle power system including a fuel cell, an external circuit, and a controller is disclosed. The fuel cell includes an oxidant inlet valve and an oxidant outlet valve. The fuel cell may be connected to an external circuit having electrical contacts. The electrical contacts may be configured to move to and from an opened position and a closed position such that in the closed position the fuel cell may provide current to an electric machine. The controller may be programmed to initiate a command to supply an oxidant to the fuel cell. In response to a load being greater than a threshold amount, the controller may position the inlet and/or outlet valves such that an amount of oxidant provided is between 80% and 100% of the full-capacity amount. But, in response to a no-load or low load event and a hydrogen-protective-state, the controller positions the inlet and/or outlet valves to provide an amount of oxidant that is less than 80% of the full-capacity amount.

A method of managing an electrochemical cell voltage is disclosed. The method includes providing an oxidant to the fuel cell at a specific flow rate responsive to a load. The flow rate may be an operating flow rate if the load is more than a threshold amount, or the flow rate may be less than the operating flow rate if the load is less than the threshold amount.

DETAILED DESCRIPTION

Figure 1:
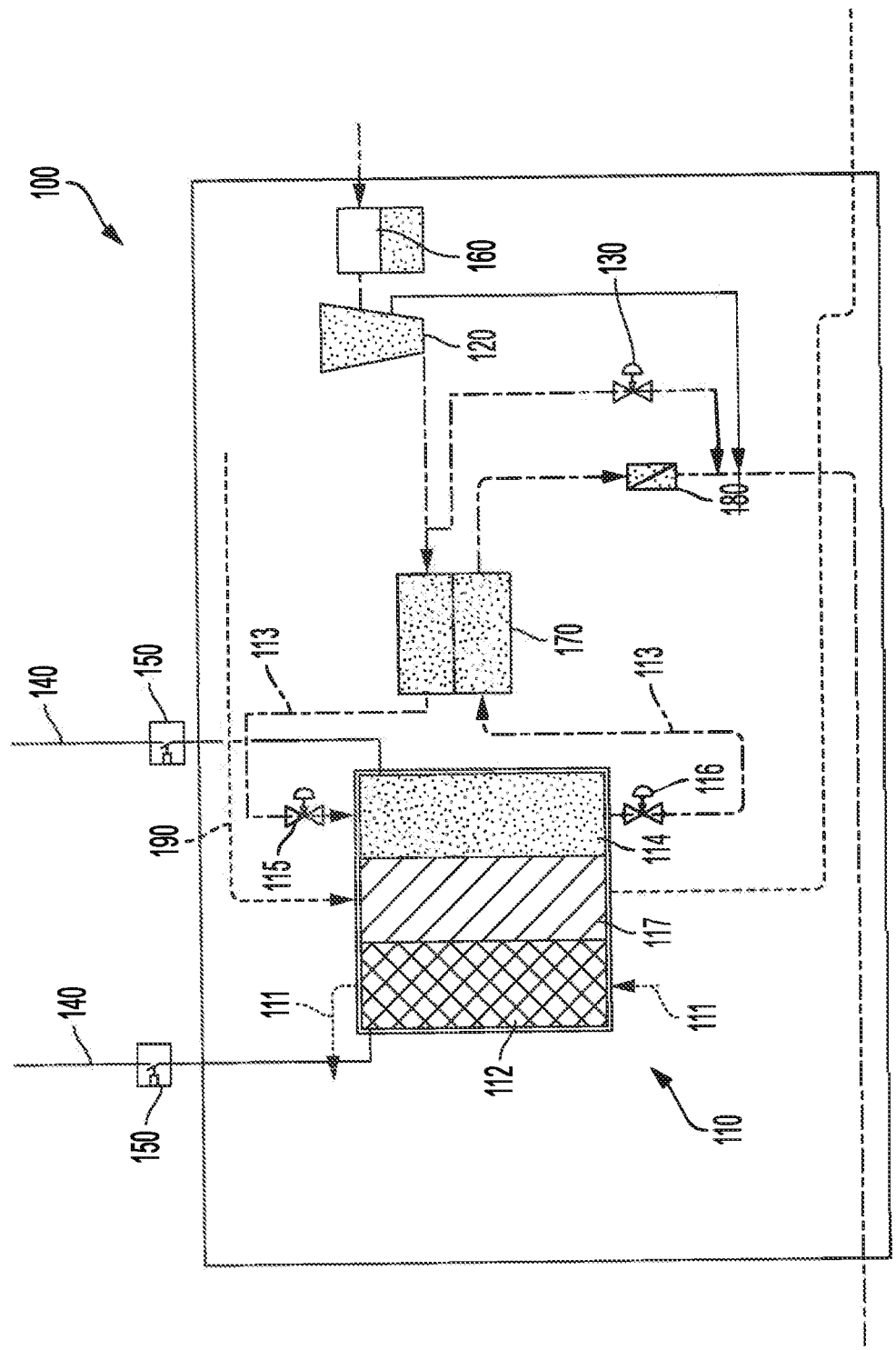
FIG. 1 is a schematic view of a power system.
Figure 2:
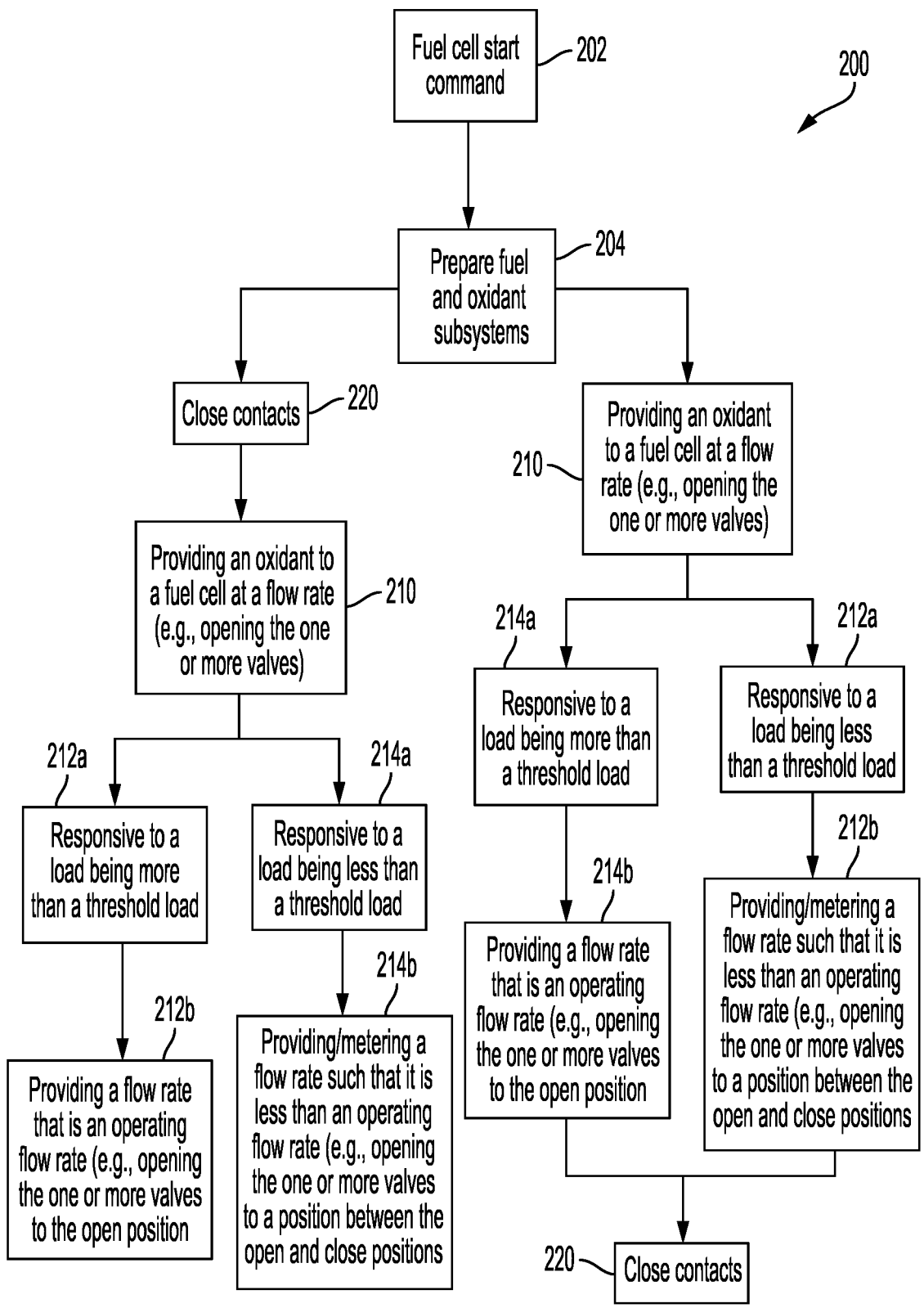
FIG. 2 is a flow chart illustrating a method for managing a fuel cell voltage during a no-load or low load event.

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities in this disclosure are to be understood as modified by the word "about" in describing the broader scope of this disclosure. Practice within the numerical limits stated is generally preferred. A description of constituents in chemical terms refers to the constituents at the time of addition to any combination specified in the description and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Processes executed by a vehicle system or vehicle computing system located in a vehicle may be discussed herein, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems. In certain embodiments, particular components of the vehicle associated computing system may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more controllers or processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In the illustrative embodiments discussed herein, an exemplary, non-limiting example of a process performable by a computing system may be shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Referring to FIG. 1, a power system 100 is disclosed. The power system 100 may be a vehicle power system. The power system 100 may include a fuel cell 110, and a compressor 120. The vehicle power system 100 may further include a bypass valve 130. The power system 100 may be used to power an electric machine such as an electric machine of a vehicle for propelling the vehicle.

The fuel cell 110 is an electrochemical cell that utilizes chemical reactions to generate electricity. The fuel cell 110 may use one or more redox reactions. The fuel cell 110 may include a fuel passage 111 configured to supply a fuel such as hydrogen ($H_2$) and an oxidant passage 113 configured to supply an oxidant, i.e., oxidizing agent such as oxygen ($O_2$) to the fuel cell 110. Each passage 111/113 may have an inlet and outlet to and from the fuel cell 110. The fuel and/or oxidant may be supplied by a pump or compressor 120. The pump or compressor 120 may be in fluid communication with the fuel cell 110 via the inlet. To generate a continuous supply of electricity a continuous supply or flow of fuel and oxygen may be provided. The fuel cell 110 includes an anode 112 and a cathode 114 with an electrolyte 117 therebetween. Catalyst may be used at the electrodes to facilitate reactions for generating electricity. The electrical current produce by the fuel cell 110 may be used to power an electric machine such as by an external circuit 140. The external circuit 140 may be connected to the fuel cell 110 such that current generated from the fuel cell 110 may be used to power the electric machine. The electric machine may impose a load on the fuel cell 110. At a load above a threshold load, the fuel cell 110 may operate at a desirable voltage (i.e., below a threshold voltage), however under a lower load or no-load (i.e., a load below the threshold load) conditions of the voltage may exceed the desirable voltage. Said differently, the voltage of the fuel cell 110 may exceed a desirable voltage during a no-load or low load event. The threshold load may be more than the load while idling. For example, the threshold load may be 40 A or more, or more preferably 35 A or more, or even more preferably 30 A or more. In a refinement, the load may be expressed by the current density, for example, a threshold current density of at least 0.1 A/cm$^2$, or more preferably at least 0.08 A/cm$^2$, or even more preferably at least 0.05 A/cm$^2$. For example, the threshold voltage may be less than 1.0 volts per cell, or more preferably less than 0.9 volts per cell, or even more preferably less than 0.85 volts per cell, or still even more preferably 0.825 volts per cell. No-load or low load events may occur during start-up or idling/stopping. During a no-load or low load event and at full operating capacity the fuel cell voltage may exceed a threshold voltage, which may be undesirable.

However, reducing the reaction rate may control the fuel cell voltage. The reaction rate may be controlled by managing the amount of the reactants. For example, the flow rate of the fuel and/or oxidant provided to the anode and/or cathode may be controlled. For example, an inlet and/or outlet valve may be employed in the one or more of passages 111/113 to meter the fuel and/or oxidant traveling to the anode 112 and/or cathode 114.

For example, the fuel cell 110 may employ an oxidant inlet valve 115 and an oxidant outlet valve 116. One or more of valves may be positioned such that metering the oxidant during a no-load or low load event may be achieved. The valves may control, for example, the flow rate of the oxidant entering the fuel cell 110 and contacting the cathode 114.

If less oxygen is permitted (i.e., a lower flow rate is provided) the voltage will be lower or will not rise as quickly. For example, if the fuel cell is starved of oxygen such that the oxygen stoichiometry is less than necessary for the redox reactions the voltage will be lower or not rise as quickly. Each valve may have an opened position and a closed position. Positions between the opened and closed positions may correspond to a flow rate and hence a voltage or voltage increase rate. For example, the inlet valve 115 may be opened from 1 to 75 degrees, or more preferably from 3 to 45 degrees, or even more preferably 5 to 30 degrees from the closed position to meter oxidant to the cathode. This flow rate may be less than a (normal) operating flow rate. The operating flow rate refers to a flow rate achieved when the one or more valves are in the open position. In a refinement, the operating flow rate may be achieved if the one or more valves are within 30 degrees, or more preferably within 15 degrees, or even more preferably within 5 degrees of the open position. Said differently when the one or more valves are in the opened position, they yield a full-capacity amount and during a no-load or low load event the one or more valves may meter the oxidant such that is less than 80% of the full-capacity amount, or more preferably less than 60%, or even more preferably less than 40%. So normal operation or a normal load may provide 80 to 100% of the full-capacity amount, or more preferably 80 to 100%, or even more preferably 100%. Thus, if the amount or flow rate of, for example, oxidant is reduced the voltage or voltage increase will be reduced.

The bypass valve 130 may be disposed upstream of the inlet or outlet valve 115, 116 (i.e., between the valves and the compressor) such that excessive pressure is released. For example, if the bypass valve 130 is employed in the oxidant passage between the valves and compressor 120, it is configured to release a pressure above a threshold pressure such that the compressor 120 is not impaired. The bypass valve 130 may also assist in performing a hydrogen purge or initiating a hydrogen-protective-state. The bypass valve 130 provide airflow to the exhaust system without running the gas through the fuel cell. This may allow the system to be purged without passing oxygen through the cathode.

One or more additional valves may be located further downstream from the outlet valve 116. The one or more additional valves may also be configured to move to a position for metering or managing the flow rate of the fuel and/or oxidant. One or more additional valves may assist in maintaining a hydrogen-protective-state. A hydrogen-protective-state may be desirable when the fuel cell is not in use to improve the longevity of the fuel cell. A hydrogen-protective-state refers to a state where the fuel cell is flooded with the hydrogen such that it migrates from the anode to the cathode and disposes any remaining oxygen from the system. However, a hydrogen-protective-state can only be maintained for a duration of time once the power system is shutdown. Therefore, when the fuel cell is not in use, oxygen may migrate into the fuel cell despite the valves being closed. But one or more additional valves may extend the duration of time that the hydrogen-protective-state may be maintained.

The valves may be configured to meter the oxidant during a no-load or low load event only after immediately preceding a hydrogen-protective-state. For example, a sensor may be used to measure the amount of oxygen in the fuel cell 110 or at the cathode 114. In yet another example, the duration that the hydrogen-protective-state may be maintained may be predetermined such that when the predetermined time lapses the fuel cell 110 is no longer considered to be in a hydrogen-protective-state. It may be preferable to not meter the oxidant flow rate when oxidant is already in the fuel cell 110 or when the oxidant is present in an amount beyond a threshold amount. The threshold amount may correspond to an undesirable voltage or voltage increase rate. Thus, the valves may be configured to meter the oxidant responsive to a hydrogen-protective-state or immediately preceding a hydrogen-protective-state. Alternatively, the manner in which the valves meter or increase the flow rate may be responsive to whether or not a hydrogen-protective-state was maintained prior to the no-load or low load event. For example, if a hydrogen-protective-state was maintained the valves may be configured to ramp-up the flow rate while metering the oxidant. However, if the hydrogen-protective-state has lapsed or was not maintained, the valves may be configured to step-up the flow rate of the oxidant such that oxidant may be introduced into the fuel cell 110 faster.

The external circuit 140 may include electrical contacts 150 such that the fuel cell may be electrically connected and disconnected from an electric machine. The electrical contacts 150 may be configured to move to and from an opened position and a closed position. The closed position may connect the fuel cell 110 to the electric machine such that during operation the electric machine is powered by a current generated by the fuel cell 110.

The power systems disclosed herein may further employ a controller. The controller may be programmed to command the supply of the oxidant to the fuel cell 110 during operation. In response to a no-load or low load event (i.e., an event having a load lower than a threshold amount) and the fuel cell 110 being in a hydrogen-protective-state, the controller executes a command to position the inlet and outlet valves 115, 116 such that they meter an amount of oxidant received by the fuel cell 110. The controller may position the valves such that a voltage of the fuel cell 110 does not exceed a threshold voltage. In a refinement, the controller may position the valves such that the average fuel cell voltage of cell stack does not exceed a threshold voltage. The controller may also be programmed to move the electrical contacts 150 to and from the opened and closed positions.

Figure 3A:
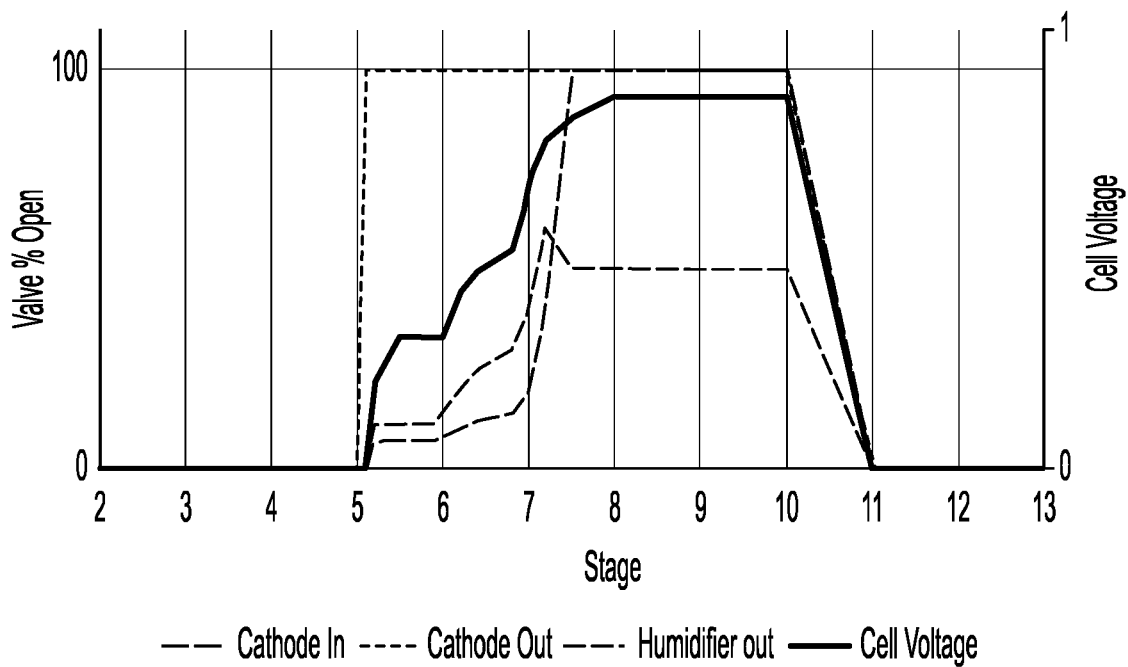
FIG. 3A is a graph illustrating the relationship between an inlet valve of a fuel cell and the cell voltage for an embodiment according to the disclosure herein.
Figure 3B:
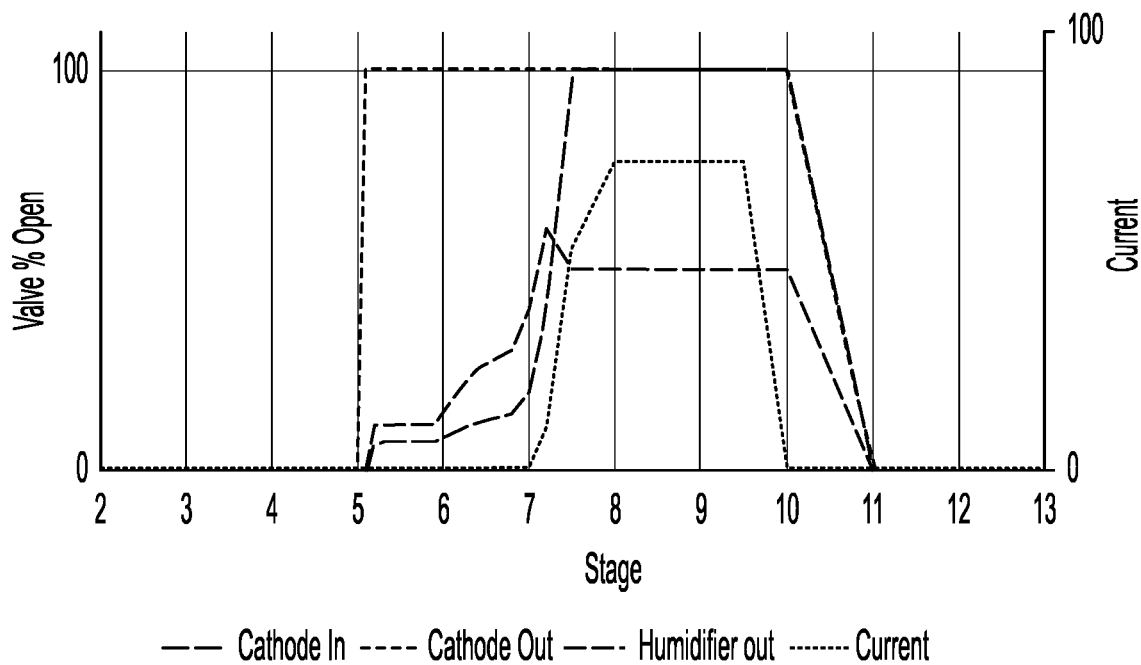
FIG. 3B is a graph illustrating the relationship between the inlet valve and the cell current of the embodiment of FIG. 3A.
Figure 3C:
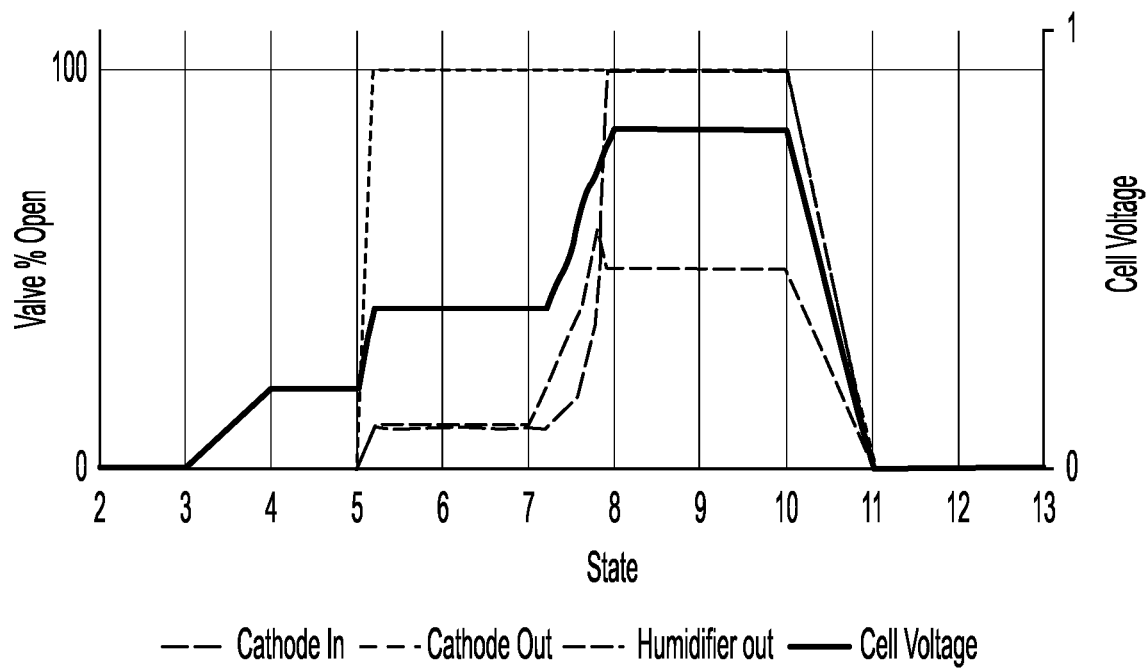
FIG. 3C is a graph illustrating the relationship between an inlet valve of a fuel cell and the cell voltage of another embodiment according to the disclosure herein.
Figure 3D:
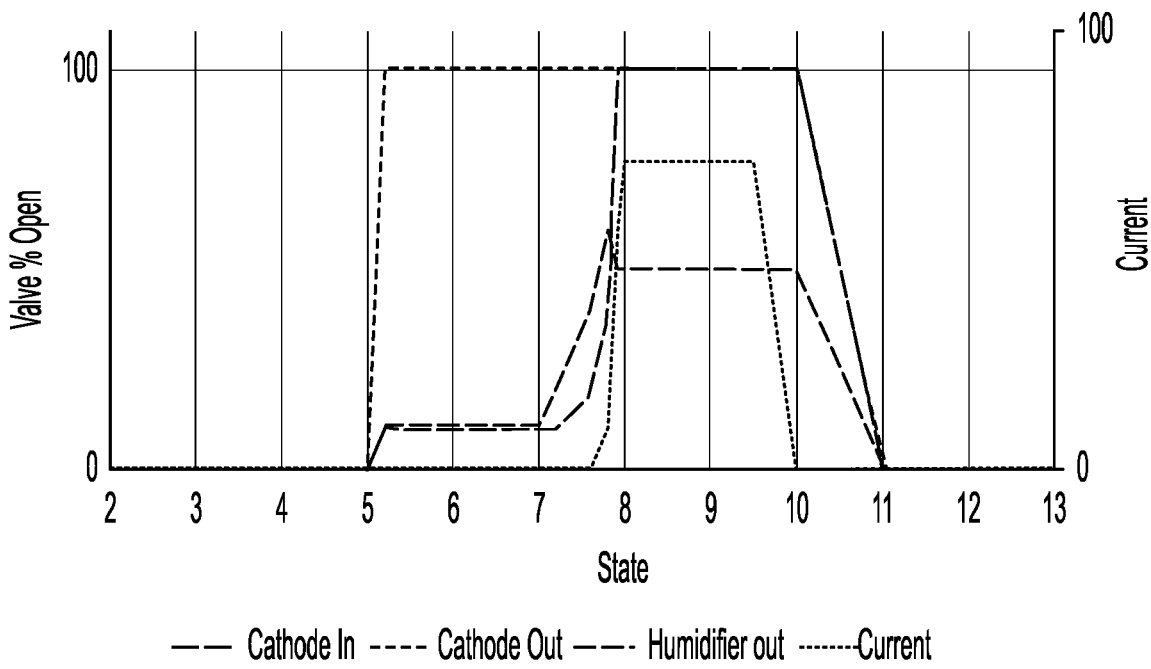
FIG. 3D is a graph illustrating the relationship between the inlet valve and the cell current of the embodiment of FIG. 3C.

In a refinement, the controller may be programmed to move the electrical contacts 150 to the closed position prior to receiving a current request and/or prior to positioning, for example, the inlet valve to meter the amount of oxidant received by the fuel cell 110, as shown in FIGS. 3A-B. In yet another refinement, the controller is programmed to position, for example, the inlet valve to meter the amount of oxidant received by the fuel cell 110 and subsequently move the electrical contacts 150 to the closed position, as shown in FIGS. 3C-D. The controller may implement either or both strategies such that the voltage or voltage increase rate of the fuel cell does not exceed a threshold.

For exemplary purposes the above embodiments may have been described with reference to positioning the inlet valve however it should be understood that the outlet valve alternatively or in combination may be positioned such as to meter the amount of oxygen entering the fuel cell and accessing the cathode.

The power system 100 disclosed herein may also include an air filter 160, a humidifier 170, a throttle 180, a coolant system 190 or a combination thereof.

A method 200 of managing an electrochemical cell (e.g., a fuel cell) and more particularly the voltage thereof is disclosed. The method 200 may include initiating or receiving a fuel cell start up command (i.e., step 202) such as during start-up of a vehicle and preparing the fuel and oxidant subsystems (i.e., step 204) such as warming and/or starting the pump and/or compressor. The method 200 also includes providing an oxidant to a fuel cell at a flow rate (i.e., step 210). In response to a load being more than a threshold load (i.e., step 212a), the flow rate may be an operating flow rate (i.e., step 212b) but in response to the load being less than a threshold load (i.e., step 214a), the flow rate may be less than an operating flow rate (i.e., step 214b). The operating flow rate may be a max flow rate or a flow rate of at least 60% of capacity, or more preferably at least 80% or even more preferably at least 90%. The electrical contacts may be closed (i.e., step 220) prior to (as shown in FIG. 3A-B) or after (as shown in FIG. 3C-D) providing the oxidant to the fuel cell. The flow rate may be altered based on a voltage of the fuel cell. For example, a controller may receive data from a sensor and alter the position of one or more valves, such as the inlet valve, to alter the flow rate. The altered flow rate may correspond to a desired voltage. Upon receiving a current request or a conventional operating load the one or more valves may be moved to the opened position such that an operating flow rate is provided for normal operation of the power system and vehicle.

For example, the cell voltage and current of a power system as described herein is depicted in FIGS. 3A-D as it progresses through various stages detailed below in Table I.

TABLE I

| Stages | Description |
|---|---|
| 1 | Pre-start up |
| 2 | |
| 3 | Prepare fuel (e.g., $H_2$) supply subsystem |
| 4 | Prepare oxidant (e.g., $O_2$) supply subsystem |
| 5 | Introduce fuel (e.g., $H_2$) and/or oxidant (e.g., $O_2$) into the system to a load sustaining concentration |
| 6 | Close contacts and introduce oxidant ($O_2$) |
| 7 | Warmup and begin drawing current/load |
| 8 | Normal operation |
| 9 | |
| 10 | Shutdown |
| 11 | |
| 12 | |
| 13 | |

Figure 4:
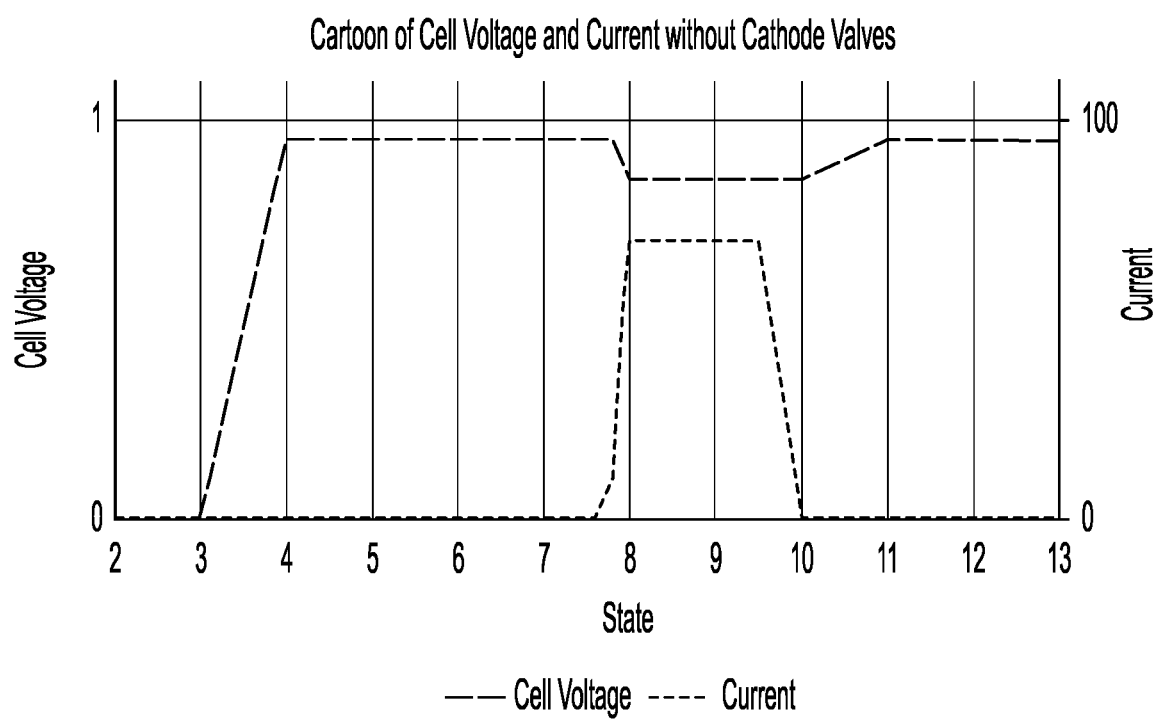
FIG. 4 is a graph illustrating the voltage and current of a conventional fuel cell.

A conventional fuel cell that does not meter the amount of oxidant during a no-load or low load conditions is provided in FIG. 4. A conventional fuel cell achieves a higher voltage and the voltage spikes much sooner and more prominently than the fuel cells as described herein. For example, the conventional fuel cell demonstrates a steep voltage spike at stage 3 (FIG. 4) as opposed to a spike at a later stage (FIG. 3A) or a more gradual spike that ends at stage 8 (FIG. 3C).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle power system comprising:
    a fuel cell including an oxidant inlet valve and an oxidant outlet valve;
    an external circuit connected to the fuel cell and having electrical contacts that move to and from an opened position and a closed position such that in the closed position and during operation the fuel cell powers an electric machine connected to the external circuit; and
    a controller programmed to
        initiate a command to supply an oxidant to the fuel cell such that responsive to a load being greater than a threshold amount, the controller positions the oxidant inlet valve and the oxidant outlet valve to provide an amount of oxidant to the fuel cell that is 80-100% of a full-capacity amount, and responsive to the load being less than the threshold amount, the controller positions the oxidant inlet valve and the oxidant outlet valve to provide an amount of oxidant to the fuel cell that is less than 80% of the full-capacity amount, and
        move the electrical contacts to the closed position prior to a current request and subsequent to metering the amount of oxidant such that a voltage increase of the fuel cell does not exceed a threshold voltage increase amount.

2. The vehicle power system of claim 1, wherein the controller is programmed to meter the amount of oxidant via the oxidant inlet valve and the oxidant outlet valve such that a voltage of the fuel cell does not exceed a threshold voltage.

3. The vehicle power system of claim 1, wherein the command to supply the oxidant to the fuel cell is executed during a start-up, idling, or stop event.

4. The vehicle power system of claim 1, wherein the threshold amount is more than an idling load.

5. A vehicle comprising the electric machine connected to the external circuit of the vehicle power system of claim 1.

6. A power system comprising:
    a fuel cell including an oxidant inlet valve and an oxidant outlet valve;
    an external circuit connected to the fuel cell and having electrical contacts that move to and from an opened position and a closed position such that in the closed position and during operation the fuel cell powers an electric machine connected to the external circuit; and
    a controller programmed to
        initiate a command to supply an oxidant to the fuel cell such that responsive to a load being greater than a threshold amount, the controller positions the oxidant inlet valve and the oxidant outlet valve to provide an amount of oxidant to the fuel cell that is 80-100% of a full-capacity amount, and responsive to the load being less than the threshold amount, the controller positions the oxidant inlet valve and oxidant outlet valve to provide an amount of oxidant to the fuel cell that is less than 80% of the full-capacity amount, and position the oxidant inlet valve and the oxidant outlet valve to meter the amount of oxidant and subsequently move the electrical contacts to the closed position such that a voltage increase of the fuel cell does not exceed a threshold voltage increase amount.

7. The vehicle power system of claim 1, further comprising a bypass valve between a compressor in fluid communication with the fuel cell and the oxidant inlet valve, wherein the bypass valve is configured to release the oxidant such that the compressor does not exceed a threshold pressure.

8. The vehicle power system of claim 1, wherein the oxidant inlet valve is configured to be positioned at a position, between open and close, corresponding to a predetermined voltage increase rate.

9. The vehicle power system of claim 1, further comprising an additional valve downstream of the oxidant outlet valve, the additional valve being configured to coordinate with the oxidant inlet valve and the oxidant outlet valve to manage the amount of oxidant supplied to a cathode of the fuel cell.

10. The vehicle power system of claim 1, wherein the oxidant inlet valve is configured to manage the amount of oxidant provided to a cathode of the fuel cell during a low load event as long as the fuel cell was previously in a hydrogen-protective-state.

11. The vehicle power system of claim 1, wherein the oxidant inlet valve is configured to manage the amount of oxidant provided to a cathode of the fuel cell by ramping-up an oxidant flow rate.

12. The vehicle power system of claim 1, wherein the oxidant inlet valve is configured to manage the amount of oxidant provided to a cathode of the fuel cell by stepping-up an oxidant flow rate when the fuel cell was not previously in a hydrogen-protective-state.

13. The power system of claim 6, wherein the controller is programmed to meter the amount of oxidant via the oxidant inlet valve and the oxidant outlet valve such that a voltage of the fuel cell does not exceed a threshold voltage.

14. A vehicle comprising an electric machine configured to be powered by the power system of claim 6.

* * * * *